United States Patent
Contino et al.

(10) Patent No.: US 8,356,338 B1
(45) Date of Patent: Jan. 15, 2013

(54) WIRELESS DRIVE FILE PEERING

(75) Inventors: Jeffrey R. Contino, Shawnee, KS (US);
Warren B. Cope, Olathe, KS (US);
Douglas Alan Olding, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 808 days.

(21) Appl. No.: 12/190,701

(22) Filed: Aug. 13, 2008

(51) Int. Cl.
*H04L 29/06* (2006.01)

(52) U.S. Cl. ............................................ 726/4; 709/218

(58) Field of Classification Search ........................ None
See application file for complete search history.

(56) References Cited

U.S. PATENT DOCUMENTS

| | | | |
|---|---|---|---|
| 7,777,689 B2 * | 8/2010 | Fratti et al. ..................... | 343/895 |
| 2003/0074529 A1 | 4/2003 | Crohas | |
| 2003/0216954 A1 | 11/2003 | Buzzelli | |
| 2005/0070329 A1 * | 3/2005 | Lection et al. ................. | 455/557 |
| 2005/0191998 A1 | 9/2005 | Onyon et al. | |
| 2006/0010270 A1 | 1/2006 | Zhang | |
| 2006/0069814 A1 * | 3/2006 | Abraham et al. ................ | 710/8 |
| 2007/0002011 A1 * | 1/2007 | Kurlander et al. ............ | 345/156 |
| 2007/0143307 A1 | 6/2007 | Bowers et al. | |
| 2007/0186212 A1 | 8/2007 | Mazzaferri et al. | |
| 2007/0198656 A1 | 8/2007 | Mazzaferri et al. | |
| 2007/0201502 A1 | 8/2007 | Abramson | |
| 2007/0204115 A1 | 8/2007 | Abramson | |
| 2007/0289000 A1 | 12/2007 | Weiss | |
| 2008/0082310 A1 | 4/2008 | Sandorfi et al. | |
| 2008/0184125 A1 | 7/2008 | Suleiman et al. | |
| 2009/0031006 A1 | 1/2009 | Johnson | |
| 2009/0222655 A1 | 9/2009 | Martinent et al. | |
| 2009/0298480 A1 | 12/2009 | Khambete et al. | |

FOREIGN PATENT DOCUMENTS

WO  2008067432  6/2008

OTHER PUBLICATIONS

CNET Reviews; "Tritton WiFi NAS;" Nov. 26, 2007; 4 pages; http://reviews.cnet.com/external-hard-drives/tritton-wifi-nas/4505-3190_7-31149112.html?tag=mp.

Micro Anvika UK; "ASUS 40GB Wireless Hard Disk Drive," Nov. 26, 2007; 2 pages; http://www.microanvika.com/product.asp?TXT=INFO&PNO=ASU54305A&ref=sidebanner&cam=ASU54305A.

Belkin; "Wireless G USB Network Adapter," Nov. 26, 2007; 2 pages; http://catalog.belkin.com/IWCatProductPage.process?Product_Id=179211.

Memsen Corporation; "Mobile Interactive Marketing—Coming Soon!;" Nov. 26, 2007; 7 pages; http://www.memsen.com/datavendor_desc.htm.

Memsen Corporation; "Everybody has something to Share;" Nov. 26, 2007; 1 page; http://www.memsen.com/index.htm.

USPTO Office Action Summary mailed Nov. 17, 2010 from U.S. Appl. No. 11/945,524.

* cited by examiner

*Primary Examiner* — Gilberto Barron, Jr.
*Assistant Examiner* — Izunna Okeke

(57) ABSTRACT

A configuration message is received from a first computer system. In response to the configuration message, a first wireless device is enumerated on the first computer system as locally attached mass storage. A registration message is sent to a wireless network. File information about a shared file is received from a second wireless device. The second wireless device is enumerated on a second computer system as locally attached mass storage. A shared block of data is received from the second wireless device. The shared block of data is sent to the first computer system as data that is stored on a locally attached mass storage device.

18 Claims, 6 Drawing Sheets

WIRELESS DRIVE FILE PEERING

RELATED APPLICATIONS

This application is related to U.S. patent application Ser. No. 11/945,524, titled "EMULATING A REMOVABLE MASS STORAGE DEVICE" filed on Nov. 27, 2007. This application is related to U.S. patent application Ser. No. 12/133,501, titled "PLUG-IN FILE SHARING" filed on Jun. 5, 2008.

TECHNICAL BACKGROUND

Small, lightweight, removable and rewritable storage devices are becoming more popular. These devices, such as Universal Serial Bus (USB) "keychain drives," USB flash drives, memory sticks, or flash memory cards offer advantages over floppy disks. They are smaller, faster, more reliable, and more durable than floppy disks. Their reliability and durability is typically a result of the fact that these drives have no moving parts.

To access or store data on a flash drive, the drive must be connected to a computer. Typically, this is done by plugging the device into a port built into the computer. These flash drives, like other plug-in devices, often can be connected and disconnected from the computer without opening the computer's enclosure. Once connected, the computer can then communicate with the flash drive using a mass storage standard. These standards are supported by many modern operating systems such as Windows and Linux. The plug-in connection may also supply power to the flash drive.

The Universal Serial Bus is defined in the Universal Serial Bus Specification, revision 1.1 and Universal Serial Bus Specification, revision 2.0 which are hereby incorporated herein by reference. These documents are available from the USB Implementers Forum web page at www.usb.org.

Overview

A peer-to-peer data sharing system is disclosed. A first wireless interface receives first data from a first wireless communication device that is enumerated as a first locally attached mass storage device by a first computer system. The first computer system comprises a first attached mass storage device storing a first file comprising first data. A second wireless interface sends the first data to a second wireless communication device that is enumerated as a second locally attached mass storage device by a second computer system. The first data is communicated to the second computer system as data that was stored on the second locally attached mass storage device. A network carries the first data between the first wireless interface and the second wireless interface.

A method of operating a wireless device is disclosed. A first wireless device is identified to a first computer system as a first locally attached mass storage. The first wireless device is removable from the first computer system without opening a case of the first computer system. The first wireless device is registered on a wireless network. Information about common data is received from a second wireless device via the wireless network. The common data is data that is stored on a second computer system. The second wireless device is identified to the second computer system as a second locally attached mass storage. The second wireless device is removable from the second computer system without opening a case of the second computer system. A storage request is sent to the second computer system via the wireless network. Common data is received from the second computer system via the wireless network.

A method of peer-to-peer file sharing is disclosed. A configuration message is received from a first computer system. In response to the configuration message, a first wireless device is enumerated on the first computer system as locally attached mass storage. A registration message is sent to a wireless network. File information about a shared file is received from a second wireless device. The second wireless device is enumerated on a second computer system as locally attached mass storage. A shared block of data is received from the second wireless device. The shared block of data is sent to the first computer system as data that is stored on a locally attached mass storage device.

DETAILED DESCRIPTION

Figure 1:
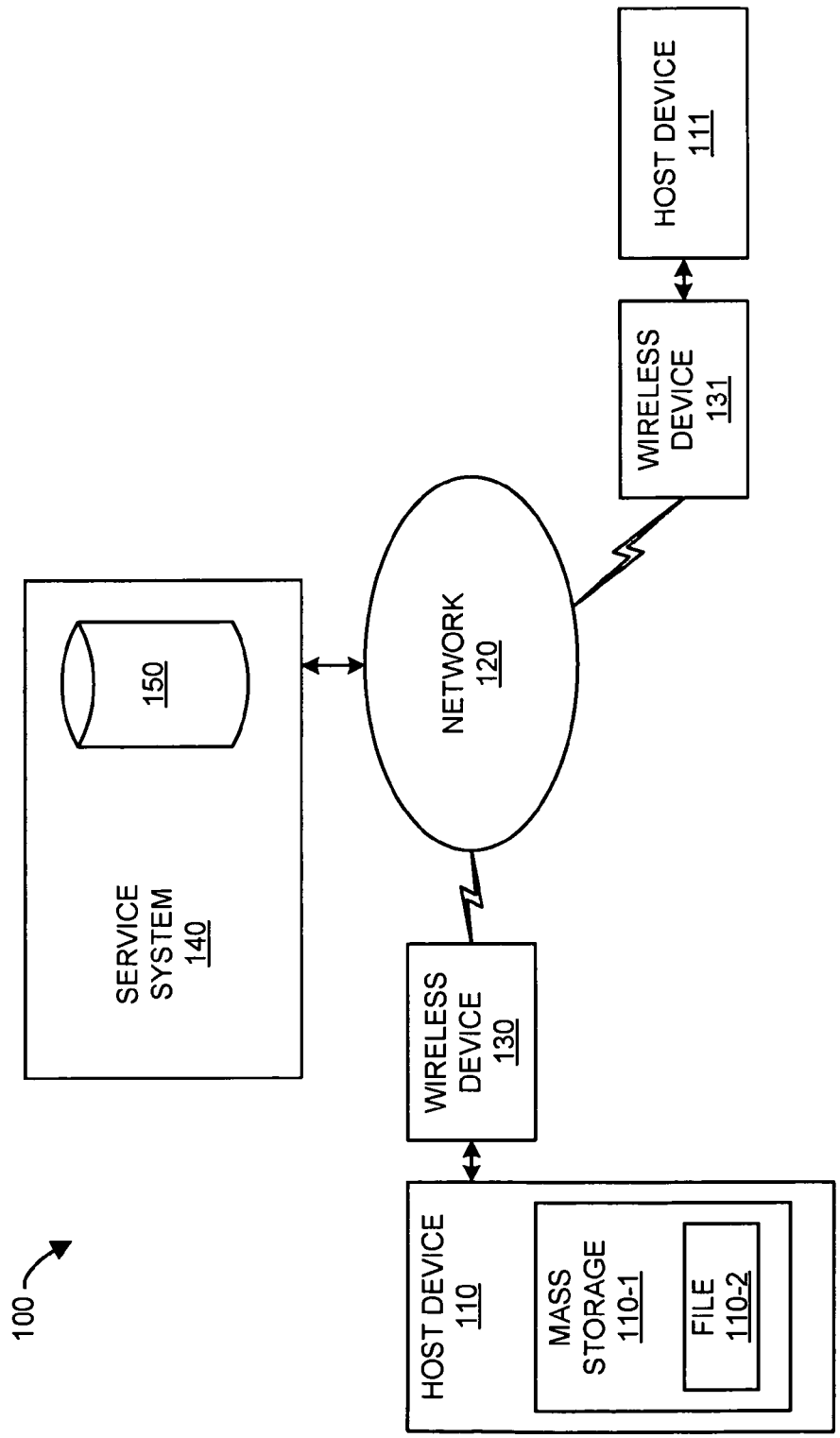
FIG. 1 is a block diagram illustrating a wireless peer-to-peer data sharing system.

FIG. 1 is a block diagram illustrating a wireless peer-to-peer data sharing system. In FIG. 1, communication system 100 comprises host device 110, host device 111, wireless device 130, wireless device 131, network 120, and service system 140. Service system 140 includes database 150. Host device 110 includes mass storage 110-1. Mass storage 110-1 includes shared file 110-2. Host device 110 is connected to wireless device 130. Wireless device 130 is operatively coupled to network 120 via a broadband wireless connection. Thus, host device 110 is operatively coupled to network 120. Host device 111 is connected to wireless device 131. Wireless device 131 is operatively coupled to network 120 via a broadband wireless connection. Thus, host device 111 is operatively coupled to network 120.

Network 120 is operatively coupled to service system 140. Since service system 140 includes database 150, and network 120 is operatively coupled to service system 140, network 120 is operatively coupled to database 150.

Network 120 may be any network or collection of networks that couple, link, or otherwise operatively connect wireless device 130 and wireless device 131 with each other or other devices or systems and is also operatively coupled to service system 140. Network 120 may include other secondary data networks. In an example, network 120 may include a backhaul network, a local network, a long distance network, or a packet network, or any combination thereof, as well as other types of networks.

In an example, communication network 120 may be, or include all or parts of an IEEE 802.16 (WiMAX) specified system. These parts may include a base station (BS); an access services network (ASN), access services network gateway (ASN-GW), or connectivity service network (CSN). In another example, service system 140 may also be a part of a WiMAX specified system.

Service system 140 may be any system or collection of systems, such as database 150, capable of storing and retrieving information about at least one of: (a) services provided by network 120; (b) services provided by or to networks or users connected to network 120; or, (c) configuration information for network 120. In an example, service system 140 is part of a CSN and performs authentication, authorization, and accounting operations. In another example, service system 140 is a device capabilities server (DCS) and provides information about wireless device 130 and wireless device 131. Service system 140 may manage user or device profiles for authentication (e.g., verifying device identifier, user name, or password).

Service system 140 may provide configuration information to network 120 that specifies a type of service to deliver, and policies to enforce that may restrict access by, or services provided to, wireless device 130 and wireless device 131. For example, when wireless device 130 or wireless device 131 first couples to network 120, wireless device 130 or wireless device 131 may send a registration message to network 120 asking for permission to use network 120 to communicate to other systems. The registration message may include a device identifier. Network 120 may then forward that registration message, along with a device identifier to service system 140. Service system 140 may then query database 150 with the device identifier to determine if wireless device 130 or wireless device 131 may use network 120. Service system 140 may then inform network 120 whether wireless device 130 or wireless device 131 may use network 120.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 140 may also query database 150 to provide configuration information to network 120 that determines how wireless device 130 or wireless device 131 may use network 120. For example, service system 140 may configure network 120 to operatively couple wireless device 130 only to wireless device 131. This configuration would prevent wireless device 130 from utilizing other services such as operatively coupling to internet servers for viewing web pages Likewise, service system 140 may configure network 120 to operatively couple wireless device 131 only to wireless device 130. This configuration would prevent wireless device 131 from utilizing other services such as operatively coupling to internet servers for viewing web pages.

Service system 140 may also configure network 120 to process data coming from, or destined for, wireless device 130 or wireless device 131. For example, service system 140 may configure network 120 to translate packets received from wireless device 130 or wireless device 131 from one format or protocol to another before sending these translated packets to wireless device 131 or wireless device 130, respectively. It should also be understood that service system 140 may include additional elements not pictured for the sake of clarity.

Wireless device 130 or wireless device 131 may be any device, system, or other such communication platform capable of wirelessly communicating with network 120. Wireless device 130 or wireless device 131 may be, for example, a mobile phone, a wireless phone, a wireless modem, a wireless USB modem, a personal digital assistant (PDA), as well as other types of devices or systems that can communicate wirelessly with network 120.

Wireless device 130 may process enumeration or configuration requests to and from host device 110. For example, wireless device 130 may be connected to host device 110 via a USB port. To successfully communicate with each other, host device 110 and wireless device 130 may perform a USB enumeration process. Wireless device 131 may process enumeration requests to and from host device 111. Likewise, wireless device 131 may be connected to host device 111 via a USB port. To successfully communicate with each other, host device 111 and wireless device 131 may perform a USB enumeration process. This enumeration process is described in the Universal Serial Bus Specifications, revisions 1.1 and 2.0. In another embodiment, wireless device 130 or wireless device 131 may perform a different enumeration process. For example, wireless device 130 or wireless device 131 may perform a flash memory card enumeration process.

The enumeration process may also include a configuration process. To accomplish the configuration process, wireless device 130 may supply host device 110 with information about wireless device 130. One type of information that may be supplied to host device 110 by wireless device 130 is a device class. A device class helps inform host device 110 about the characteristics of wireless device 130. A device class may also help inform host device 110 about the protocols or capacities of wireless device 130. For example, wireless device 130 may inform host device 110 that it is a serial communication device, such as a modem.

Likewise, to accomplish the configuration process, wireless device 131 may supply host device 111 with information about wireless device 131. One type of information that may be supplied to host device 111 by wireless device 131 is a device class. A device class helps inform host device 111 about the characteristics of wireless device 131. A device class may also help inform host device 111 about the protocols or capacities of wireless device 131. For example, wireless device 131 may inform host device 111 that it is a serial communication device, such as a modem.

In an embodiment, wireless device 130 informs host device 110 that wireless device 130 should be configured and controlled as a mass storage device. Wireless device 131 informs host device 111 that wireless device 131 should be configured and controlled as a mass storage device. For example, wireless device 130 or wireless device 131 may, as part of a USB enumeration process, inform host device 110 or host device 111, respectively, that it should be enumerated as, and thus treated as, a USB Mass Storage Class (MSC) device. In another example, wireless device 130 or wireless device 131 may inform host device 110 or host device 111, respectively, that it should be enumerated as a removable mass storage device such as a flash memory card.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page at www.usb.org.

As a result of wireless device 131 informing host device 111 that wireless device 131 should be configured and controlled as a mass storage device, host device 111 may treat wireless device 131 as a locally attached mass storage device. For example, host device 111 may enumerate wireless device 131 as a USB flash drive. That may mean that host device 111 would use portions of its operating system software, such as device drivers, intended to be used with a USB flash drive to configure, control, and communicate with wireless device 131. Host device 111 may use these portions of its operating system software even though wireless devices, in general, would normally be enumerated as communication devices.

If host device 110 is treating wireless device 130 as a locally attached mass storage device, it allows wireless device 130 to be treated as locally attached mass storage by non-driver parts of the operating system and applications. For example, if host device 110 were running a Windows XP operating system, wireless device 130 may appear under the "Devices with Removable Storage" heading of the "My Computer" folder. Alternatively, wireless device 130 may appear under the "Hard Disk Drives" heading of the "My Computer" folder.

If host device 111 is treating wireless device 131 as a locally attached mass storage device, it allows wireless device 131 to be treated as locally attached mass storage by non-driver parts of the operating system and applications. For example, if host device 111 were running a Windows XP operating system, wireless device 131 may appear under the "Devices with Removable Storage" heading of the "My Computer" folder. Alternatively, wireless device 131 may appear under the "Hard Disk Drives" heading of the "My Computer" folder.

Host device 110 or host device 111 may also use communication and configuration protocols intended for locally attached mass storage devices to communicate with wireless device 130 and wireless device 131, respectively. Wireless device 130 or wireless device 131 may emulate a mass storage device by also using the corresponding communication and configuration protocols to communicate with host device 110 and host device 111, respectively. For example, host device 110 or host device 111 may use Advanced Technology Attachment Packet Interface (ATAPI) command blocks and command sets to communicate with wireless device 130 or wireless device 131, respectively. Likewise, wireless device 130 and wireless device 131 would use ATAPI command blocks and command sets to communicate with host device 110 and host device 111, respectively.

In another example, host device 110 may use the Small Computer System Interface (SCSI) commands to communicate with wireless device 130. Likewise, wireless device 130 may use SCSI commands to communicate with host device 110. In the preceding examples, these protocols may be encapsulated in USB packets for communication with wireless device 130 via a USB port on host device 110. Host device 111 and wireless device 131 may interact in the same or a manner similar to those described previously for host device 110 and wireless device 130. Wireless device 130 or wireless device 131 may translate the communication and configuration protocols intended for locally attached mass storage devices into a format suitable for communication with wireless device 131 or wireless device 130, respectively, via network 120.

Network 120 may process packets of data it exchanges with wireless device 130 via a wireless communication link. These packets of data may, for example, comprise data destined for wireless device 131. These packets of data may be data retrieved from mass storage 110-1. This data may be data that is shared with host device 111 via wireless device 131. This shared data may be stored in a shared file 110-2 that is stored by mass storage 110-1.

In an embodiment, these packets of data may contain data with communication and configuration protocols intended for locally attached mass storage devices to communicate. For example, wireless device 130 or wireless device 131 may send, and network 120 may receive and process, packets of data with ATAPI command blocks and command sets. In another example, wireless device 130 or wireless device 131 may send, and network 120 may receive and process, SCSI commands. In another example, these protocols may be encapsulated in USB packets and wireless device 130 or wireless device 131 may send, and network 120 may receive and process these USB packets.

Host device 110 or wireless device 130 may process packets of data received from network 120 or wireless device 131 to translate them into data or commands mass storage 110-1. Host device 110 or wireless device 130 may also process packets of data received from mass storage 110-1 to translate them into data or commands for network 120 or wireless device 131. For example, host device 110 or wireless device 130 may translate packets of data received from wireless device 131 into commands or data that is understood by mass storage 110-1. Host device 110 or wireless device 130 may also translate packets of data received from mass storage 110-1 into data or commands for network 120 or wireless device 131.

In an embodiment, network 120 is configured so that host device 110 and host device 111 may share data stored by mass storage 110-1. The shared data may be stored in a shared file 110-2 stored by mass storage 110-1. The shared data may be a file system or directory stored by mass storage 110-1. Thus, by plugging wireless device 130 into host device 110, host device 110 is able to share data (in the form of a shared file 110-2 or directory) with host device 111 via network 120 in a peer-to-peer manner. Likewise, by plugging wireless device 131 into host device 111, host device 111 is able to share data with host device 110 via network 120 by writing to shared file 110-2.

To access the shared data, network 120 may associate one or more device identifiers with a shared file 110-2 file or a directory stored by mass storage 110-1. The device identifiers may be associated with wireless device 130 or wireless device 131. The device identifiers may act as a security component for access to the shared data. In other words, access to the shared file or directory may be limited to access by host devices that communicate using a wireless device associated with particular device identifiers. Thus, access to the shared file 110-2 or directory depends upon a connection with a wireless device that has a device identifier that has been associated with the shared file or directory by network 120 or host 110.

In an embodiment, host device 110 and host device 111 may use wireless device 130, wireless device 131, and network 120 to exchange data. Because wireless device 130 or wireless device 131 are enumerated as locally attached mass storage, host device 110 and host device 111 can exchange data without the use of an extensive networking protocol stack or software.

Figure 2:
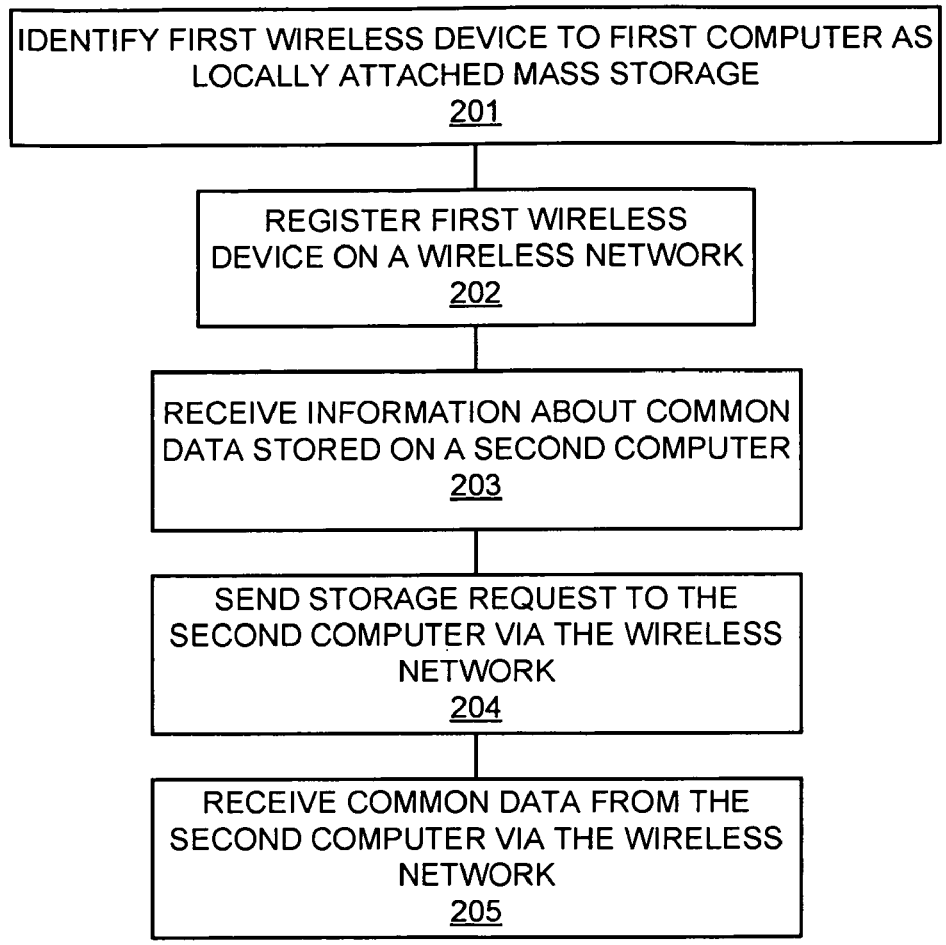
FIG. 2 is a flowchart illustrating a method of operating a wireless device.

FIG. 2 is a flowchart illustrating a method of operating a wireless device. The method of FIG. 2 may be performed by communication system 100.

A first wireless device is identified to a first computer system as locally attached mass storage (201). For example, wireless device 131 may identify itself to host device 111 as a locally attached mass storage device. Wireless device 131 may inform host device 111 that wireless device 131 should be configured and controlled as a mass storage device. As a result host device 111 may treat wireless device 131 as a locally attached mass storage device. For example, host device 111 may enumerate wireless device 131 as a USB flash drive. That may mean that host device 111 would use portions of its operating system software, such as device drivers, intended to be used with a USB flash drive to configure, control, and communicate with wireless device 131.

The first wireless device is registered on a wireless network (202). For example, wireless device 131 may register itself on network 120. As a result of this registration, wireless device 131 may be matched to a peer-to-peer sharing service. For example, service system 140 may match the registration request from wireless device 131 to a shared data service associated with wireless device 130 or host device 110. Wireless device 131's registration request may be matched to a peer-to-peer sharing service by an association of a first device identifier to a peer-to-peer sharing service. For example, a MAC address given in the registration request may be associated with a uniform resource locator (URL) that specifies the peer-to-peer sharing service offered by wireless device 130 or host device 110. In another example, a MAC address may be associated with an internet protocol (IP) address and user datagram protocol (UDP) port number that provides the peer-to-peer sharing service offered by wireless device 130 or host device 110. In another example, a URL identifies a wireless device 130 or host device 110 and a location (e.g., folder or directory) where shared information (or data) is stored.

Information about common data stored on a second computer system is received (203). For example, directory or file information associated with shared file 110-2 may be received by wireless device 131. Host device 111 may receive this directory or file information from wireless device 131. Host device 111 may receive this directory or file information as if the directory or file resided in a locally attached mass storage device.

A storage request is sent to the second computer system via the wireless network (204). For example, host device 111 may request data from shared file 110-2. This request, which may be in the form of a read request, may be sent by wireless device 131 to network 120. Network 120 may be configured to relay this request to wireless device 130. Wireless device 130 may relay this request to host device 110.

Common data is received from the second computer via the wireless network (205). For example, wireless device 131 may receive data from shared file 110-2 via network 120. Wireless device 131 may receive data from shared file 110-2 that wireless device 130 or host device 110 retrieved from mass storage 110-1. This data may be relayed by wireless device 130 to network 120.

Figure 3:
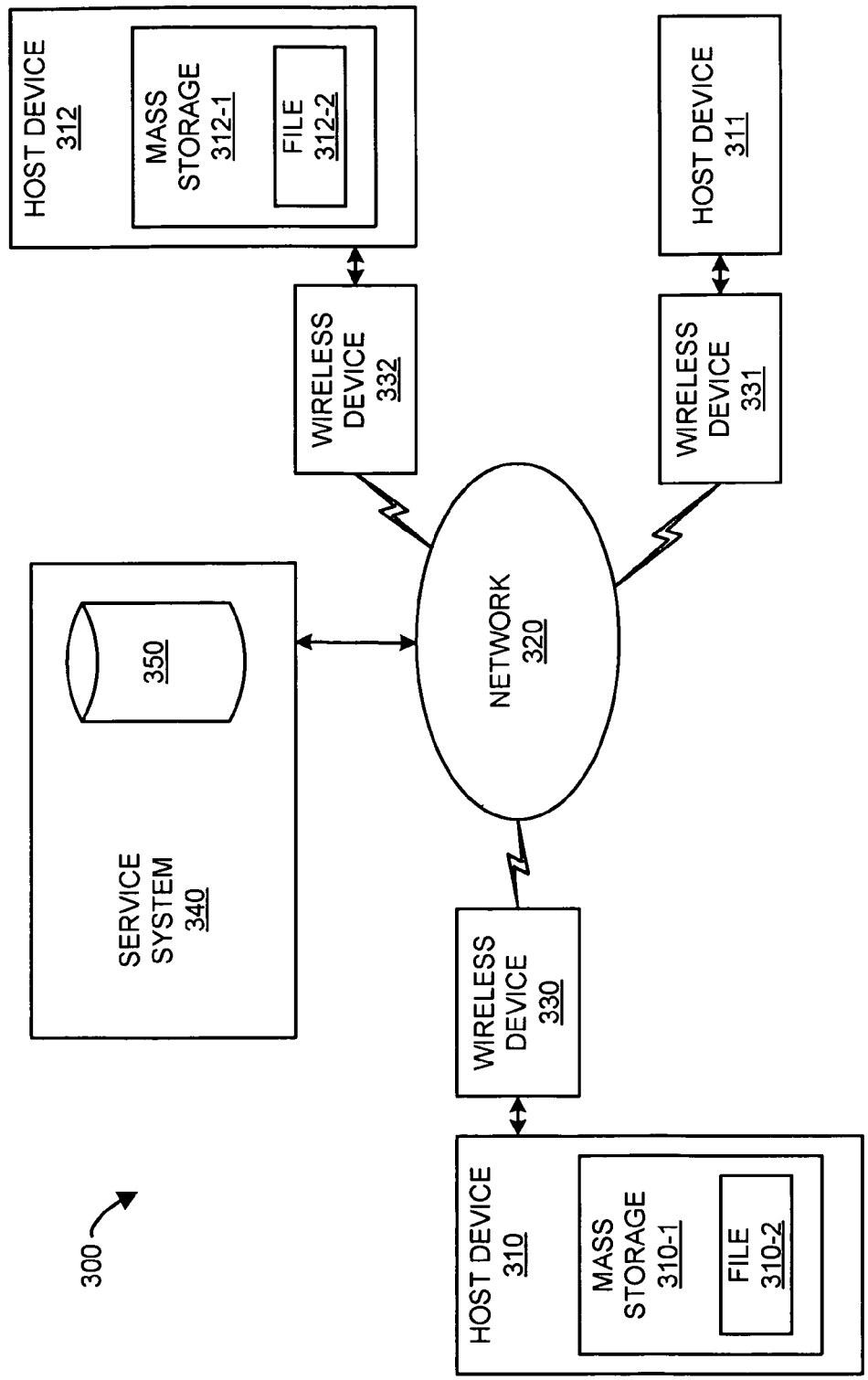
FIG. 3 is a block diagram illustrating a communication system for wireless peer-to-peer file sharing.

FIG. 3 is a block diagram illustrating a communication system for wireless peer-to-peer file sharing. In FIG. 3, communication system 300 comprises host device 310, host device 311, host device 312, wireless device 330, wireless device 331, wireless device 332, network 320, and service system 340. Service system 340 includes database 350.

Host device 310 includes mass storage 310-1. Mass storage 310-1 includes shared file 310-2. Host device 310 is connected to wireless device 330. Wireless device 330 is operatively coupled to network 320 via a broadband wireless connection. Thus, host device 310 is operatively coupled to network 320.

Host device 311 is connected to wireless device 331. Wireless device 331 is operatively coupled to network 320 via a broadband wireless connection. Thus, host device 311 is operatively coupled to network 320.

Host device 312 includes mass storage 312-1. Mass storage 312-1 includes shared file 312-2. Host device 312 is connected to wireless device 332. Wireless device 332 is operatively coupled to network 320 via a broadband wireless connection. Thus, host device 312 is operatively coupled to network 320.

Network 320 is operatively coupled to service system 340. Since service system 340 includes database 350, and network 320 is operatively coupled to service system 340, network 320 is operatively coupled to database 350.

Network 320 may be any network or collection of networks that couple, link, or otherwise operatively connect wireless device 330, wireless device 331, and wireless device 332 with each other or other devices or systems and is also operatively coupled to service system 340. Network 320 may include other secondary data networks. In an example, network 320 may include a backhaul network, a local network, a long distance network, or a packet network, or any combination thereof, as well as other types of networks.

In an example, communication network 320 may be, or include all or parts of an IEEE 802.16 (WiMAX) specified system. These parts may include a base station (BS); an access services network (ASN), or connectivity service network (CSN). In another example, service system 340 may also be a part of a WiMAX specified system.

Service system 340 may be any system or collection of systems, such as database 350, capable of storing and retrieving information about at least one of: (a) services provided by network 320; (b) services provided by or to networks or users connected to network 320; or, (c) configuration information for network 320. In an example, service system 340 is part of a CSN and performs authentication, authorization, and accounting operations. In another example, service system 340 is a device capabilities server (DCS) and provides information about wireless device 330, wireless device 331, and wireless device 332. For example, service system 340 may provide information that indicates wireless device 330 or wireless device 332 are offering peer-to-peer file sharing services to wireless device 331. In another example, service system 340 may provide information that indicates wireless device 330 and wireless device 332 are offering peer-to-peer file sharing services to each other. Service system 340 may also manage user or device profiles for authentication (e.g., verifying device identifier, user name, or password).

Service system 340 may provide configuration information to network 320 that specifies a type of service to deliver, and policies to enforce that may restrict access by, or services provided to, wireless device 330, wireless device 331, and wireless device 332. For example, when wireless device 330 first couples to network 320, wireless device 330 may send a registration message to network 320 asking for permission to use network 320 to communicate to other systems. The registration message may include a device identifier. Network 320 may then forward that registration message, along with a device identifier to service system 340. Service system 340 may then query database 350 with the device identifier to determine if wireless device 330 may use network 320. Service system 340 may then inform network 320 whether wireless device 330 may use network 320.

A device identifier may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

Service system 340 may also query database 350 to provide configuration information to network 320 that determines how wireless devices 330-332 may use network 320. For example, service system 340 may configure network 320 to operatively couple wireless device 330 only to wireless device 331. This configuration would prevent wireless device 330 from utilizing other services such as operatively coupling to internet servers for viewing web pages Likewise, service system 340 may configure network 320 to operatively couple wireless device 331 only to wireless device 330. This configuration would prevent wireless device 331 from utilizing other services such as operatively coupling to internet servers for viewing web pages.

Service system 340 may also configure network 320 to process data coming from, or destined for, wireless devices 330-332. For example, service system 340 may configure network 320 to translate packets received from wireless devices 330-332 from one format or protocol to another before sending these translated packets to another of wireless devices 330-332. It should also be understood that service system 340 may include additional elements not pictured for the sake of clarity.

Wireless devices 330-332 may be any device, system, or other such communication platform capable of wirelessly communicating with network 320. Wireless devices 330-332 may be, for example, a mobile phone, a wireless phone, a wireless modem, a wireless USB modem, a personal digital assistant (PDA), as well as other types of devices or systems that can communicate wirelessly with network 320.

Wireless device 330 may process enumeration or configuration requests to and from host device 310. For example, wireless device 330 may be connected to host device 310 via a USB port. To successfully communicate with each other, host device 310 and wireless device 330 may perform a USB enumeration process. Wireless device 330 may process enumeration requests to and from host device 310. Likewise, wireless device 331 may be connected to host device 311 via a USB port. To successfully communicate with each other, host device 311 and wireless device 331 may perform a USB enumeration process. This enumeration process is described in the Universal Serial Bus Specifications, revisions 1.1 and 2.0. In another embodiment, wireless devices 330-332 may perform a different enumeration process. For example, wireless devices 330-332 may perform a flash memory card enumeration process.

The enumeration process may also include a configuration process. To accomplish the configuration process, wireless device 330 may supply host device 310 with information about wireless device 330. One type of information that may be supplied to host device 310 by wireless device 330 is a device class. A device class helps inform host device 310 about the characteristics of wireless device 330. A device class may also help inform host device 310 about the protocols or capacities of wireless device 330. For example, wireless device 330 may inform host device 310 that it is a serial communication device, such as a modem. Wireless devices 331-332 may interact with host devices 311-312, respectively, in a similar manner to accomplish a configuration process.

In an embodiment, wireless devices 330-332 inform host device 310-312 that wireless devices 330-332 should be configured and controlled as a mass storage devices. For example, wireless devices 330-332 may, as part of a USB enumeration process, inform host devices 310-312, respectively, that wireless device 330-332 should be enumerated as, and thus treated as, USB Mass Storage Class (MSC) devices. In another example, wireless devices 330-332 may inform host devices 310-312, respectively, that they should be enumerated as a removable mass storage device such as flash memory cards.

The USB Mass Storage Class is specified by the Universal Serial Bus Mass Storage Class Specification. The Universal Serial Bus Mass Storage Class Specification is a collection of documents that include the Universal Serial Bus Mass Storage Class Specification Overview, Revision 1.2; Universal Serial Bus Mass Storage Class Bulk-Only Transport, Revision 1.0; Universal Serial Bus Mass Storage Class Control/Bulk/Interrupt (CBI) Transport, Revision 1.1; Universal Serial Bus Mass Storage Class UFI Command Specification, Revision 1.0; Universal Serial Bus Mass Storage Specification For Bootability, Revision 1.0; and, the Universal Serial Bus Lockable Storage Devices Feature Specification, Revision 1.0. These documents are available from the USB Implementers Forum web page at www.usb.org.

As a result of wireless devices 330-332 informing host devices 310-312 that they should be configured and controlled as a mass storage devices, host devices 311-312 may treat wireless device 330-332 as locally attached mass storage devices. For example, host device 311 may enumerate wireless device 331 as a USB flash drive. That may mean that host device 311 would use portions of its operating system software, such as device drivers, intended to be used with a USB flash drive to configure, control, and communicate with wireless device 331. Host device 311 may use these portions of its operating system software even though wireless devices, in general, would normally be enumerated as communication devices.

If host device 311 is treating wireless device 331 as a locally attached mass storage device, it allows wireless device 331 to be treated as locally attached mass storage by non-driver parts of the operating system and applications. For example, if host device 311 were running a Windows XP operating system, wireless device 331 may appear under the "Devices with Removable Storage" heading of the "My Computer" folder. Alternatively, wireless device 331 may appear under the "Hard Disk Drives" heading of the "My Computer" folder.

Host devices 310-312 may also use communication and configuration protocols intended for locally attached mass storage devices to communicate with wireless devices 330-332, respectively. Wireless devices 330-332 may emulate a mass storage device by also using the corresponding communication and configuration protocols to communicate with host devices 330-332. Host devices 310-312 may use Advanced Technology Attachment Packet Interface (ATAPI) command blocks and command sets to communicate with wireless devices 330-332. Likewise, wireless devices 330-332 may use ATAPI command blocks and command sets to communicate with host devices 310-312.

In another example, host devices 310-312 may use the Small Computer System Interface (SCSI) commands to communicate with wireless devices 330-332. Likewise, wireless devices 330-332 would use SCSI commands to communicate with host devices 310-312. In the preceding examples, these protocols may be encapsulated in USB packets for communication with wireless devices 330-332 via USB ports on host devices 310-312. Wireless devices 330-332 may translate the communication and configuration protocols intended for locally attached mass storage devices into a format suitable for communication with wireless device 330-332 via network 120.

Network 320 may process packets of data it exchanges with wireless devices 330-332 via a wireless communication link. These packets of data may, for example, comprise data destined for wireless devices 330-332. These packets of data may be data retrieved from mass storage 310-1 or 312-1. This data may be data that is shared with host device 311 via wireless device 331. This shared data may be stored in a shared file 310-2 that is stored by mass storage 310-1. These packets of data may be data retrieved from mass storage 312-1. This shared data may be stored in a shared file 312-2 that is stored by mass storage 312-1.

In an embodiment, these packets of data may contain data with communication and configuration protocols intended for locally attached mass storage devices to communicate. For example, wireless devices 330-332 may send, and network 320 may receive and process, packets of data with ATAPI command blocks and command sets. In another example, wireless devices 330-332 may send, and network 320 may receive and process, SCSI commands. In another example, these protocols may be encapsulated in USB packets and wireless devices 330-332 may send, and network 320 may receive and process these USB packets.

Host device 310 or wireless device 330 may process packets of data received from network 320 or wireless device 331 to translate them into data or commands mass storage 310-1. Host device 312 or wireless device 332 may process packets of data received from network 320 or wireless device 331 to translate them into data or commands mass storage 312-1. Host device 310 or wireless device 330 may also process packets of data received from mass storage 310-1 to translate them into data or commands for network 320 or wireless device 331. Host device 312 or wireless device 332 may also process packets of data received from mass storage 312-1 to translate them into data or commands for network 320 or wireless device 331. In an example, host device 310 or wireless device 330 may translate packets of data received from wireless device 331 into commands or data that is understood by mass storage 310-1. Host device 310 or wireless device 330 may also translate packets of data received from mass storage 310-1 into data or commands for network 320 or wireless device 331.

In an embodiment, network 320 is configured so that host device 310 and host device 312 may share data stored by mass storage 310-1 and 312-1 with host device 311, or each other. The shared data may be stored in a shared files 310-2 or 312-2 stored by mass storage 310-1 and 312-1, respectively. The shared data may be a file systems or directories stored by mass storage 310-1 and 312-1. Thus, by plugging wireless devices 330 and 332 into host devices 310 and 312, respectively, host devices 310 and 312 are able to share data with host device 311 or each other via network 320 in a peer-to-peer manner. Likewise, by plugging wireless device 331 into host device 311, host device 311 is able to share data with host devices 310 and 312 via network 320 by reading and writing to shared files 310-2 and 312-2.

To access the shared data, network 320 may associate one or more device identifiers with shared files 310-2 and 312-2. The device identifiers may be associated with wireless devices 330-332. The device identifiers may act as a security component for access to the shared data. In other words, access to the shared file or directory on a respective host device 310 or 312 may be limited to access by host devices that communicate using a wireless device (such as wireless device 331) associated with particular device identifiers. Thus, access to the shared files 310-2 and 312-2 or directory information about mass storage 310-1 or 312-1 depends upon a connection with a wireless device with a device identifier that has been associated with the shared file or directory by network 320, or host device 310 and 312.

In an embodiment, host devices 310-312 may use wireless devices 330-331, and network 320 to exchange data. Because wireless devices 330-332 are enumerated as locally attached mass storage, host devices 310-312 can exchange data in a peer-to-peer manner without the use of an extensive networking protocol stack or software.

Figure 4:
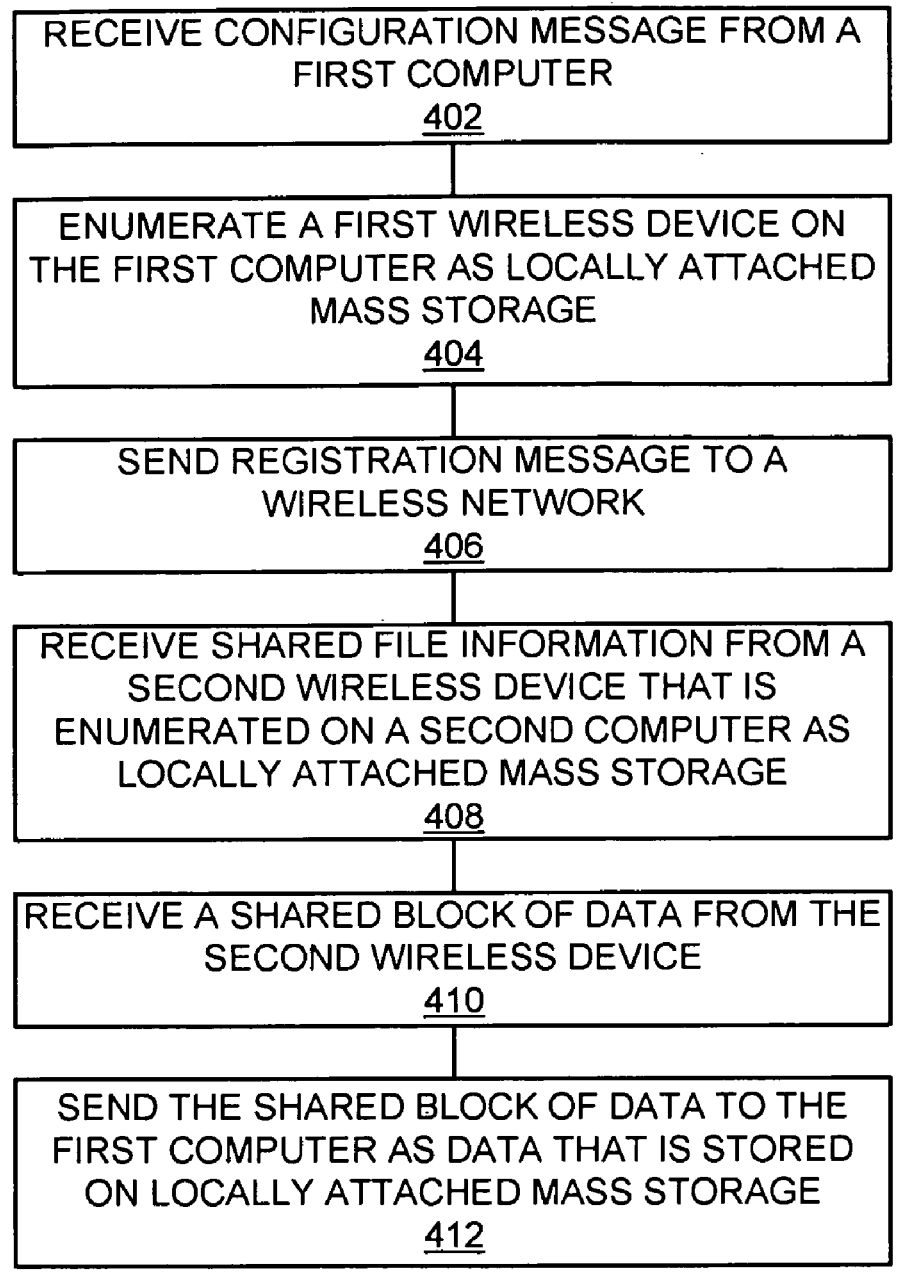
FIG. 4 is a flowchart illustrating a method of peer-to-peer file sharing.

FIG. 4 is a flowchart illustrating a method of peer-to-peer file sharing. The steps illustrated in FIG. 4 may be performed by one or more elements of communication system 100 or communication system 300.

A configuration message is received from a first computer (402). For example, wireless device 331 may receive a configuration message from host device 311. In another example, wireless device 330 may receive a configuration message from host device 310.

A first wireless device is enumerated on the first computer as a locally attached mass storage device (404). For example, wireless device 331 may identify itself to host device 311 as a mass storage device. As a result, host device 311 may enumerate wireless device 331 as a locally attached mass storage device. Host device 311 may then use communication messages and protocols associated with mass storage devices to communicate with wireless device 331.

A registration message is sent to a wireless network (406). For example, wireless device 331 may send a registration message to network 320. Information in this registration message may be used by network 320 or service system 340 to connect wireless device 331 with a peer-to-peer data sharing service. For example, information in this registration message (such as a device identifier) may be used by network 320 or service system 340 to connect wireless device 331 to wireless device 330 or 332 so that data stored in shared files 310-2 or 312-2 may be accessed by host device 311. In another example, information in this registration message may be used by network 320 or service system 340 to connect wireless devices 330 and 332 so that data stored in shared files 310-2 or 312-2 may be accessed by host devices 312 and 310, respectively.

Shared file information is received from a second wireless device that is enumerated on a second computer as a locally attached mass storage device (408). For example, information about shared file 310-2 may be received from wireless device 330. Wireless device 330 may be enumerated by host device 310 as a locally attached mass storage device.

A shared block of data is received from the second wireless device (410). For example, a block of data stored in shared file 310-2 may be received by wireless device 331 from wireless device 330. The shared block of data is sent to the first computer as data that is stored on a locally attached mass storage device (412). For example, wireless device 331 may send a block of data from shared file 310-2 to host device 311 as data that is stored on a locally attached mass storage device. Wireless device 331 may be able to send the block of data from shared file 310-2 as data that is stored on a locally attached mass storage device because wireless device 331 is enumerated as a locally attached mass storage device.

Figure 5:
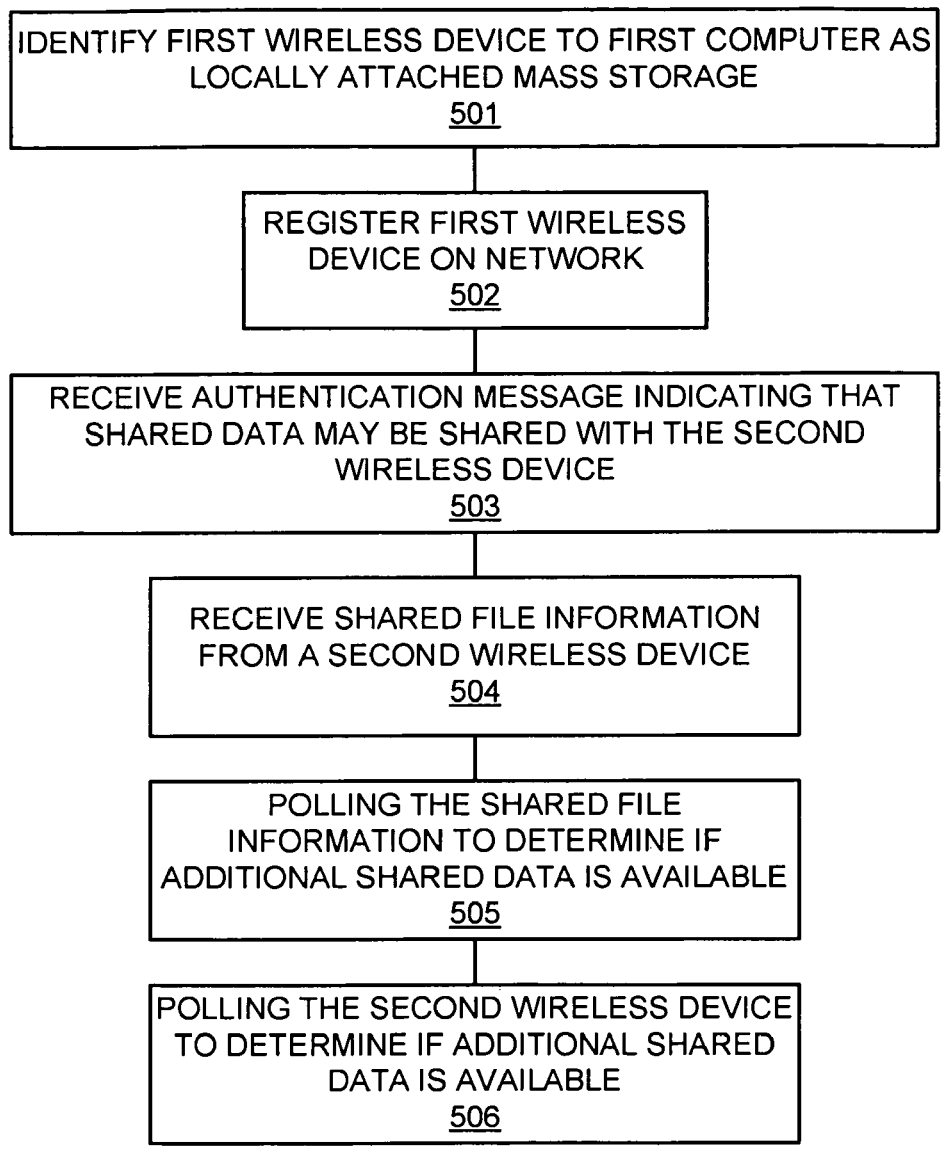
FIG. 5 is a flowchart illustrating a method of sharing data.

FIG. 5 is a flowchart illustrating a method of sharing data. The steps illustrated in FIG. 5 may be performed by one or more elements of communication system 100 or communication system 300.

A first wireless device is identified to a first computer system as a locally attached mass storage device (501). For example, wireless device 331 may identify itself to host device 311 as a locally attached mass storage device. As a result, host device 311 may enumerate wireless device 331 as a locally attached mass storage device. Host device 311 may then use communication messages and protocols associated with mass storage devices to communicate with wireless device 331.

The first wireless device is registered on a wireless network (502). For example, wireless device 331 may send a registration message to network 320. As a result, network 320 may register wireless device 331 so that it may provide wireless communication service to wireless device 331. Network 320 may query service system 340 to determine what services to provide wireless device 331. In an embodiment, network 320 determines that it is to provide wireless device 331 with a peer-to-peer data sharing connection with wireless device 330 so that wireless device 331 may access shared file 310-2. In an embodiment, network 320 also determines that it is to provide wireless device 331 with a peer-to-peer data sharing connection with wireless device 332 so that wireless device 331 may access shared file 312-2.

An authentication message is received indicating that shared data may be shared with a second wireless device (503). For example, wireless device 331 may receive an authentication message from network 320 indicating that it may share data using shared file 310-2. In another example, network 320 may receive an authentication message from service system 340 indicating that host device 311 may share data with host device 310 using shared file 310-2. This authentication message may be based on device identifiers supplied by wireless device 330, wireless device 331, or both.

Shared file information is received from the second wireless device (504). For example, information about shared file 310-2 may be received from wireless device 310. This information may include data such as the size of shared file 310-2. This information may also include data such as whether there is data in shared file 310-2 that wireless device 331 or host device 311 has not yet received. This information may also include data such as whether host device 310 has changed data in shared file 310-2 since wireless device 331 or host device 311 last received that data.

In an embodiment, the shared file is polled to determine if additional shared data is available (505). For example, wireless device 331 or host device 311 may periodically request, and receive, information from host device 310 about shared file 310-2. If this information indicates that the size of shared file 310-2 has increased, or if this information indicates that the data in shared file 310-2 has changed, host device 311 can determine that additional shared data is available.

In an embodiment, the second wireless device is polled to determine if additional shared data is available (506). For example, wireless device 331 or host device 311 may periodically request, and receive, information from wireless device 330 about shared file 310-2. If this information indicates that the size of shared file 310-2 has increased, or if this information indicates that the data in shared file 310-2 has changed, host device 311 can determine that additional shared data is available.

The methods, systems, networks, databases, and devices described above may be implemented with or executed by one or more computer systems. The methods described above may also be stored on a computer readable medium. Many of the elements of communication network 100 and communication network 300 may be, comprise, or include computers systems. This includes, but is not limited to communication system 100, host device 110, host device 111, wireless device 130, wireless device 131, network 120, service system 140, database 150, communication system 300, host device 310, host device 311, host device 312, wireless device 330, wireless device 331, wireless device 332, network 320, service system 340, and database 350.

Figure 6:
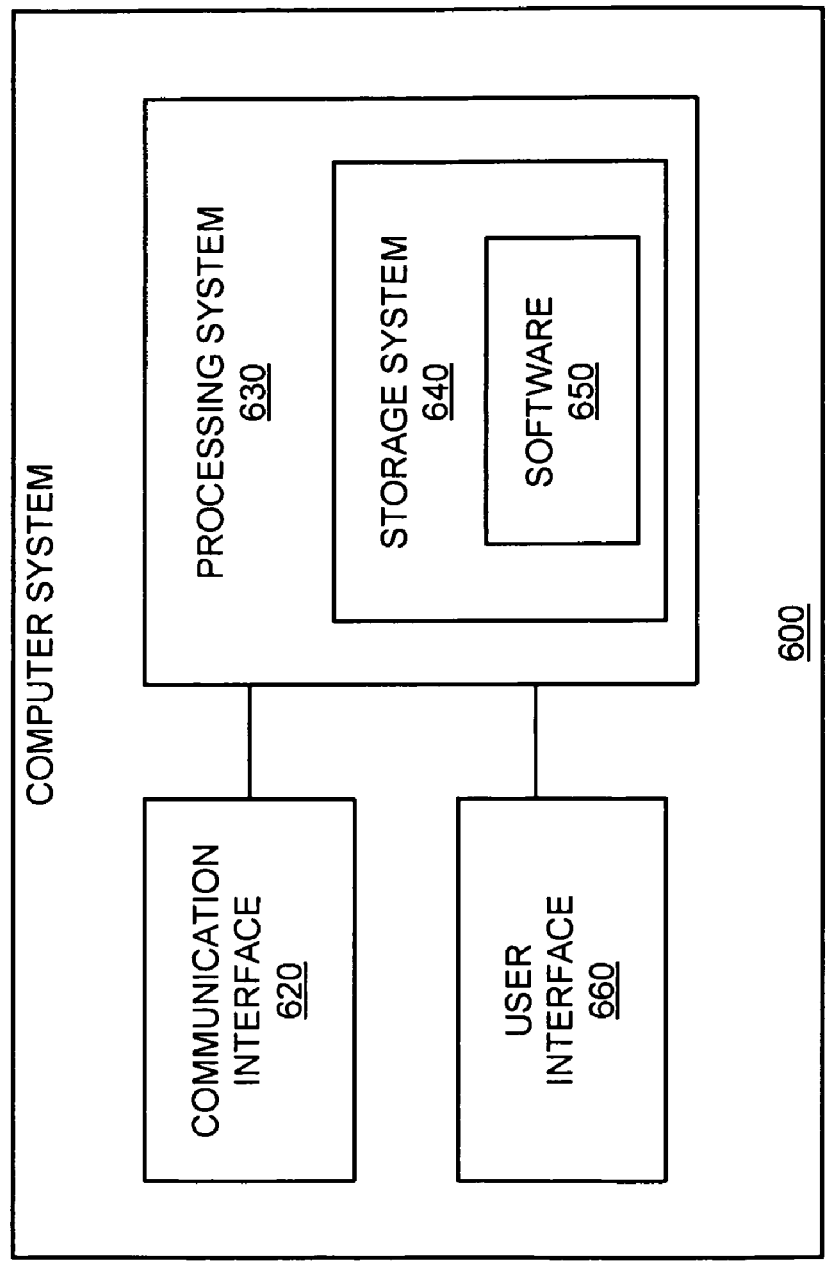
FIG. 6 is a block diagram illustrating a computer system.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A peer-to-peer file sharing system, comprising:
a first wireless device comprising first circuitry configured to connect to a first host device, instruct the first host device to enumerate the first wireless device as a first locally attached mass storage device, and wirelessly transmit a first registration request to register with a communication network, wherein the first registration request includes a first device identifier that identifies the first wireless device;
a second wireless device comprising second circuitry configured to connect to a second host device, instruct the second host device to enumerate the second wireless device as a second locally attached mass storage device, and wirelessly transmit a second registration request to register with the communication network, wherein the second registration request includes a second device identifier that identifies the second wireless device;
a service system comprising third circuitry configured to receive the first device identifier and the second device identifier, query a database with the first device identifier and the second device identifier to determine how the first wireless device and the second wireless device may utilize the communication network, and configure the communication network to operatively couple the first wireless device to the second wireless device and prevent the first wireless device and the second wireless device from utilizing other services provided by the communication network;
the second circuitry of the second wireless device configured to wirelessly transmit information about common data for delivery to the first wireless device over the communication network, wherein the common data is stored on the second host device;

the first circuitry of the first wireless device configured to receive the information about the common data, provide the information about the common data to the first host device as if the common data were stored on the first locally attached mass storage device, receive retrieval instructions from the first host device to retrieve the common data from the first locally attached mass storage device, and responsively transfer a request for the common data for delivery to the second wireless device over the communication network based on the retrieval instructions;

the second circuitry of the second wireless device configured to receive the request for the common data, receive the common data from the second host device based on the request for the common data, and transfer the common data for delivery to the first wireless device over the communication network; and the first circuitry of the first wireless device configured to receive the common data transmitted from the second wireless device and provide the common data to the first host device.

2. The system of claim 1, wherein the first circuitry of the first wireless device configured to instruct the first host device to enumerate the first wireless device as the first locally attached mass storage device comprises the first circuitry of the first wireless device configured to provide a device class to the first host device that informs the first host device of a protocol of the first locally attached mass storage device.

3. The system of claim 1, wherein the first circuitry of the first wireless device configured to provide the common data to the first host device comprises the first circuitry of the first wireless device configured to provide the common data to the first host device as if the common data were stored on the first locally attached mass storage device.

4. The system of claim 1, wherein the information about the common data comprises a directory associated with the common data.

5. The system of claim 4, wherein the first circuitry of the first wireless device configured to provide the information about the common data to the first host device as if the common data were stored on the first locally attached mass storage device comprises the first circuitry of the first wireless device configured to provide the directory to the first host device as if the directory resides in the first locally attached mass storage device.

6. The system of claim 1 wherein the communication network comprises a broadband long distance wireless network.

7. The system of claim 6, wherein the broadband long distance wireless network comprises a worldwide interoperability for microwave access specified system.

8. A method of operating a first wireless device, the method comprising:
connecting to a first computer system;
instructing the first computer system to enumerate the first wireless device as a first locally attached mass storage device;
wirelessly transmitting a first registration request to register with a communication network, wherein the first registration request includes a first device identifier that identifies the first wireless device;
receiving information transmitted from a second wireless device via the communication network about common data, wherein the common data is stored on a second computer system, and wherein the second wireless device is configured to connect to the second computer system, instruct the second computer system to enumerate the second wireless device as a second locally attached mass storage device, wirelessly transmit a second registration request to register with the communication network, wherein the second registration request includes a second device identifier that identifies the second wireless device, and wirelessly transmit the information about the common data for delivery to the first wireless device over the communication network and wherein a service system is configured to receive the first device identifier and the second device identifier, query a database with the first device identifier and the second device identifier to determine how the first wireless device and the second wireless device may utilize the communication network, and configure the communication network to operatively couple the first wireless device to the second wireless device and prevent the first wireless device and the second wireless device from utilizing other services provided by the communication network;

providing the information about the common data to the first computer system as if the common data were stored on the first locally attached mass storage device;

receiving retrieval instructions from the first computer system to retrieve the common data from the first locally attached mass storage device;

transferring a request for the common data for delivery to the second wireless device over the communication network in response to the retrieval instructions, wherein the second wireless device is configured to receive the request for the common data, receive the common data from the second computer system based on the request for the common data, and transfer the common data for delivery to the first wireless device over the communication network;

receiving the common data transmitted from the second wireless device; and providing the common data to the first computer system.

9. The method of claim 8, wherein instructing the first computer system to enumerate the first wireless device as the first locally attached mass storage device comprises providing a device class to the first computer system that informs the first computer system of a protocol of the first locally attached mass storage device.

10. The method of claim 8, wherein providing the common data to the first computer system comprises providing the common data to the first computer system as if the common data were stored on the first locally attached mass storage device.

11. The method of claim 8, wherein the information about the common data comprises a directory associated with the common data.

12. The method of claim 11, wherein providing the information about the common data to the first computer system as if the common data were stored on the first locally attached mass storage device comprises providing the directory to the first computer system as if the directory resides in the first locally attached mass storage device.

13. A method of peer-to-peer file sharing, the method comprising:
in a first wireless device, connecting to a first host device, instructing the first host device to enumerate the first wireless device as a first locally attached mass storage device, and wirelessly transmitting a first registration request to register with a communication network, wherein the first registration request includes a first device identifier that identifies the first wireless device;

in a second wireless device, connecting to a second host device, instructing the second host device to enumerate the second wireless device as a second locally attached mass storage device, and wirelessly transmitting a second registration request to register with the communication network, wherein the second registration request includes a second device identifier that identifies the second wireless device;

in a service system, receiving the first device identifier and the second device identifier, querying a database with the first device identifier and the second device identifier to determine how the first wireless device and the second wireless device may utilize the communication network, and configuring the communication network to operatively couple the first wireless device to the second wireless device and prevent the first wireless device and the second wireless device from utilizing other services provided by the communication network;

in the second wireless device, wirelessly transmitting information about common data for delivery to the first wireless device over the communication network, wherein the common data is stored on the second host device;

in the first wireless device, receiving the information about the common data, providing the information about the common data to the first host device as if the common data were stored on the first locally attached mass storage device, receiving retrieval instructions from the first host device to retrieve the common data from the first locally attached mass storage device, and responsively transferring a request for the common data for delivery to the second wireless device over the communication network based on the retrieval instructions;

in the second wireless device, receiving the request for the common data, receiving the common data from the second host device based on the request for the common data, and transferring the common data for delivery to the first wireless device over the communication network;

in the first wireless device, receiving the common data transmitted from the second wireless device; and in the first wireless device, providing the common data to the first host device.

14. The method of claim 13, wherein the information about the common data comprises a directory associated with the common data.

15. The method of claim 14, wherein providing the information about the common data to the first host device as if the common data were stored on the first locally attached mass storage device comprises providing the directory to the first host device as if the directory resides in the first locally attached mass storage device.

16. The method of claim 13, further comprising:
in the first wireless device, polling the second wireless device to determine if additional common data may be received from the second wireless device.

17. The method of claim 13, wherein instructing the first host device to enumerate the first wireless device as the first locally attached mass storage device comprises providing a device class to the first host device that informs the first host device of a protocol of the first locally attached mass storage device.

18. The method of claim 13, wherein providing the common data to the first host device comprises providing the common data to the first host device as if the common data were stored on the first locally attached mass storage device.

* * * * *